(12) United States Patent
Taki (10) Patent No.: US 12,433,559 B2
(45) Date of Patent: Oct. 7, 2025

(54) RADIATION IMAGE PROCESSING DEVICE, RADIATION IMAGE PROCESSING METHOD, AND RADIATION IMAGE PROCESSING PROGRAM

(71) Applicant: FUJIFILM Corporation, Tokyo (JP)

(72) Inventor: Tomoko Taki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 18/349,453

(22) Filed: Jul. 10, 2023

(65) Prior Publication Data

US 2024/0016464 A1 Jan. 18, 2024

(30) Foreign Application Priority Data

Jul. 13, 2022 (JP) .................. 2022-112633

(51) Int. Cl.
  *A61B 6/00* (2024.01)
(52) U.S. Cl.
  CPC ............ *A61B 6/5217* (2013.01); *A61B 6/481* (2013.01); *A61B 6/5282* (2013.01)
(58) Field of Classification Search
  CPC ..... A61B 6/5217; A61B 6/481; A61B 6/5282; A61B 6/482; A61B 6/4266; A61B 6/4291; A61B 6/5235; A61B 6/461; A61B 6/5252; A61B 6/4241; G06T 7/0014; G06T 7/62; G06T 2207/10116; G06T 2207/30004
  See application file for complete search history.

(56) References Cited

U.S. PATENT DOCUMENTS

| 11,478,209 | B2* | 10/2022 | Kawamura | .......... A61B 6/4266 |
| 2015/0379711 | A1 | 12/2015 | Imai | |
| 2017/0221207 | A1 | 8/2017 | Imai | |
| 2021/0100520 | A1 | 4/2021 | Kawamura | |
| 2023/0102862 | A1* | 3/2023 | Takahashi | ............ A61B 6/5217 382/131 |

FOREIGN PATENT DOCUMENTS

| JP | 2014-207958 A | 11/2014 |
| JP | 2021-058363 A | 4/2021 |

* cited by examiner

*Primary Examiner* — Abhishek Sarma
(74) *Attorney, Agent, or Firm* — Studebaker Brackett PLLC (57) ABSTRACT

A processor acquires two radiation images based on radiation that is transmitted through a subject including a plurality of compositions and has different energy distributions from each other, derives body thicknesses of the subject as a first body thickness and a second body thickness, respectively, for each pixel for each of the two radiation images by using an attenuation coefficient according to an order in which the radiation is transmitted through the plurality of compositions, and derives a composition ratio of the subject for each pixel of the radiation image based on the first body thickness and the second body thickness.

14 Claims, 9 Drawing Sheets

RADIATION IMAGE PROCESSING DEVICE, RADIATION IMAGE PROCESSING METHOD, AND RADIATION IMAGE PROCESSING PROGRAM

CROSS REFERENCE TO RELATED APPLICATIONS

The present application claims priority from Japanese Patent Application No. 2022-112633, filed on Jul. 13, 2022, the entire disclosure of which is incorporated herein by reference.

BACKGROUND

Technical Field

The present disclosure relates to a radiation image processing device, a radiation image processing method, and a radiation image processing program which derive a composition ratio of a subject by using a radiation image.

Related Art

In the related art, various methods of deriving a composition of a human body, such as fat and muscle, have been proposed. For example, JP2021-058363A proposes a method of, for each of two radiation images acquired by radiation transmitted through a subject and having different energy distributions from each other, deriving a body thickness of the subject as a first body thickness and a second body thickness, and deriving a composition ratio of the subject, such as muscle and fat, based on the first body thickness and the second body thickness.

Here, the radiation emitted from a radiation source has an energy distribution. An attenuation coefficient of the radiation in the subject is dependent on the energy of the radiation, and the attenuation coefficient has a characteristic of being less as an energy component is higher. For this reason, a phenomenon called beam hardening occurs in which the radiation loses a relatively large amount of low-energy components in the process of transmitting a substance, and the proportion of high-energy components is increased. A degree of beam hardening depends on a fat thickness and a muscle thickness in the subject. Therefore, in the method disclosed in JP2021-058363A, the first body thickness and the second body thickness are derived by using attenuation coefficients $\mu f(tf, tm)$ and $\mu m(tf, tm)$ which is an attenuation coefficient $\mu f$ of the fat and an attenuation coefficient $\mu m$ of the muscle represented as non-linear functions of a fat thickness tf and a muscle thickness tm.

However, in practice, the influence of the beam hardening is influenced by an order of the substances through which the radiation is transmitted. For example, there are two substances. For a first substance through which the radiation is transmitted first, the influence of the beam hardening occurs depending only on its own thickness, but for an attenuation coefficient of a second substance through which the radiation is transmitted next, the influence of the beam hardening occurs depending on the thickness of the first substance through which the radiation is transmitted first, in addition to its own thickness of the second substance. For this reason, in the method disclosed in JP2021-058363A, the influence of the beam hardening is excessively exerted, and thus an error occurs in the derivation accuracy of the composition ratio of the subject.

SUMMARY OF THE INVENTION

The present disclosure has been made in view of the above circumstances, and is to enable derivation of a composition ratio in a subject with higher accuracy.

The present disclosure relates to a radiation image processing device comprising at least one processor, in which the processor acquires two radiation images based on radiation that is transmitted through a subject including a plurality of compositions and has different energy distributions from each other, derives body thicknesses of the subject as a first body thickness and a second body thickness, respectively, for each pixel for each of the two radiation images by using an attenuation coefficient according to an order in which the radiation is transmitted through the plurality of compositions, and derives a composition ratio of the subject for each pixel of the radiation image based on the first body thickness and the second body thickness.

Note that, in the radiation image processing device according to the present disclosure, the processor may derive the composition ratio by regarding the subject as a model that is divided such that the plurality of compositions each are grouped together to have one thickness.

In addition, in the radiation image processing device according to the present disclosure, the processor may derive the composition ratio based on a difference between the first body thickness and the second body thickness.

In addition, in the radiation image processing device according to the present disclosure, the processor may change a thickness of the composition and an attenuation coefficient for each composition to derive the first body thickness and the second body thickness by using the changed thickness of the composition and the changed attenuation coefficient for each composition, and derive the composition ratio based on the thickness of the composition in which a difference between the first body thickness and the second body thickness is equal to or less than a predetermined threshold value.

In addition, in the radiation image processing device according to the present disclosure, the processor may remove scattered ray components included in the two radiation images, and derive the composition ratio based on the two radiation images from which the scattered ray components are removed.

In addition, in the radiation image processing device according to the present disclosure, the two radiation images may be acquired by two radiation detectors stacked on each other by simultaneously irradiating the two radiation detectors with the radiation transmitted through the subject.

In addition, in the radiation image processing device according to the present disclosure, the processor may display a distribution of the composition ratio in a superimposed manner on any one of the two radiation images on a display.

In addition, in the radiation image processing device according to the present disclosure, the plurality of compositions may be muscle and fat.

In addition, in the radiation image processing device according to the present disclosure, the plurality of compositions may be a bone part and a soft part.

In addition, in the radiation image processing device according to the present disclosure, the plurality of compositions may be a contrast agent injected into the subject and a tissue other than the contrast agent.

In addition, in the radiation image processing device according to the present disclosure, the processor may derive a composition image for at least one composition of the plurality of compositions based on the two radiation images and the composition ratio.

In addition, in the radiation image processing device according to the present disclosure, the processor may quantify the composition represented by the composition image based on the composition image.

The present disclosure relates to a radiation image processing method comprising acquiring two radiation images based on radiation that is transmitted through a subject including a plurality of compositions and has different energy distributions from each other, deriving body thicknesses of the subject as a first body thickness and a second body thickness, respectively, for each pixel for each of the two radiation images by using an attenuation coefficient according to an order in which the radiation is transmitted through the plurality of compositions, and deriving a composition ratio of the subject for each pixel of the radiation image based on the first body thickness and the second body thickness.

The present disclosure relates to a radiation image processing program causing a computer to execute a procedure of acquiring two radiation images based on radiation that is transmitted through a subject including a plurality of compositions and has different energy distributions from each other, a procedure of deriving body thicknesses of the subject as a first body thickness and a second body thickness, respectively, for each pixel for each of the two radiation images by using an attenuation coefficient according to an order in which the radiation is transmitted through the plurality of compositions, and a procedure of deriving a composition ratio of the subject for each pixel of the radiation image based on the first body thickness and the second body thickness.

According to the present disclosure, it is possible to derive the composition ratio in the subject with high accuracy.

DETAILED DESCRIPTION

Figure 1:
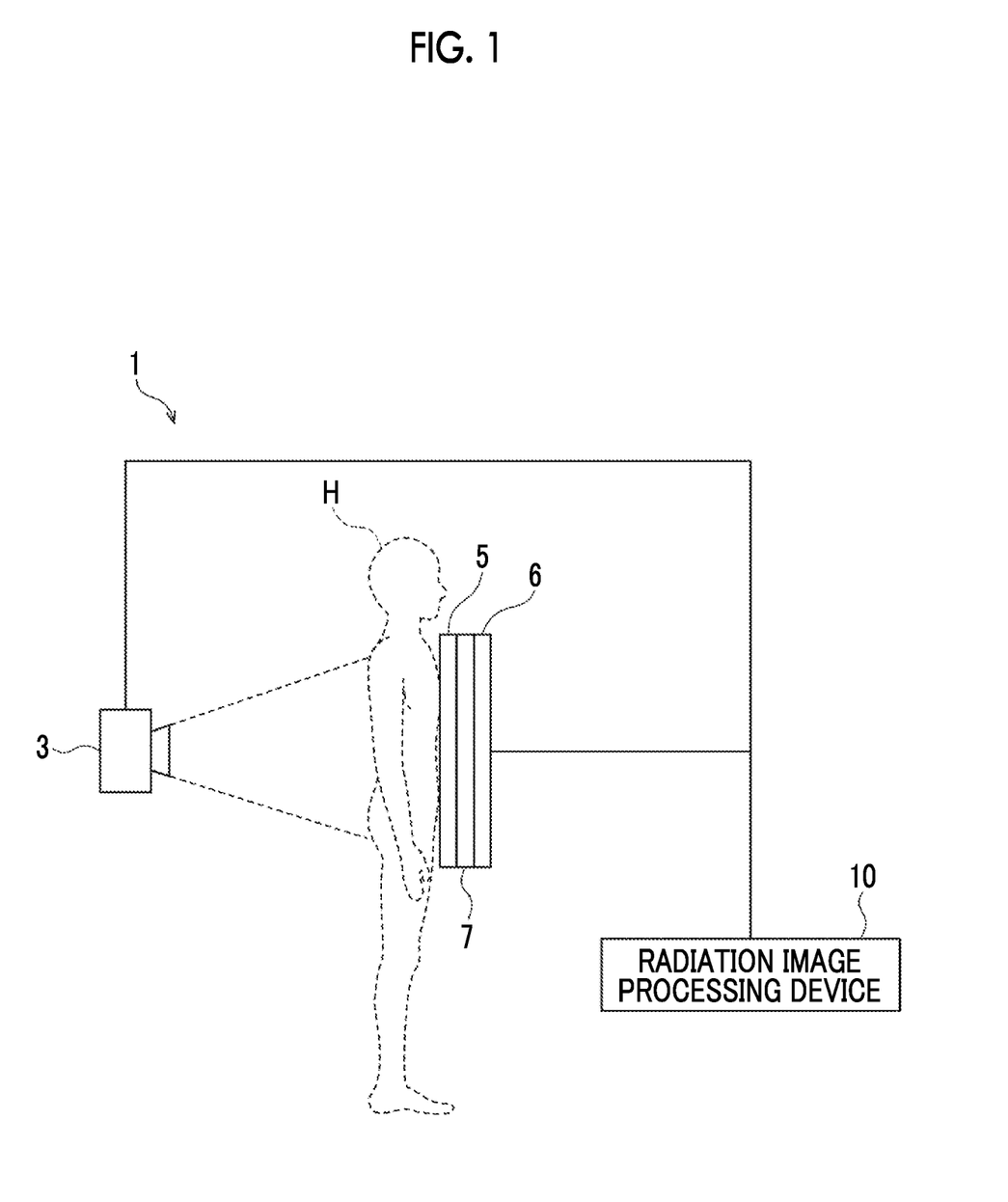
FIG. 1 is a schematic block diagram showing a configuration of a radiography system to which a radiation image processing device according to a first embodiment of the present disclosure is applied.

In the following description, an embodiment of the present disclosure will be described with reference to the drawings. FIG. 1 is a schematic block diagram showing a configuration of a radiography system to which a radiation image processing device according to a first embodiment of the present disclosure is applied. As shown in FIG. 1, the radiography system according to the present embodiment comprises an imaging apparatus 1 and a radiation image processing device 10 according to the first embodiment.

The imaging apparatus 1 is an imaging apparatus for performing energy subtraction by a so-called one-shot method for converting radiation, such as X-rays, emitted from a radiation source 3 and transmitted through a subject H into energy and irradiating a first radiation detector 5 and a second radiation detector 6 with the converted radiation. During the imaging, as shown in FIG. 1, the first radiation detector 5, a radiation energy conversion filter 7 made of a copper plate or the like, and the second radiation detector 6 are disposed in order from a side closest to the radiation source 3, and the radiation source 3 is driven. Note that the first and second radiation detectors 5 and 6 are closely attached to the radiation energy conversion filter 7.

As a result, in the first radiation detector 5, a first radiation image G1 of the subject H by low-energy radiation also including so-called soft rays is acquired. In addition, in the second radiation detector 6, a second radiation image G2 of the subject H by high-energy radiation from which the soft rays are removed is acquired. The first and second radiation images G1 and G2 are input to the radiation image processing device 10.

Note that, in the present embodiment, a scattered ray removal grid that removes a scattered ray component of the radiation transmitted through the subject H is not used during the imaging of the subject H. Therefore, the first radiation image G1 and the second radiation image G2 also include a primary ray component and the scattered ray component of the radiation transmitted through the subject H.

Here, the energy subtraction processing is processing of generating an image in which different tissues (for example, a soft part and a bone part) in the subject are extracted by using two radiation images obtained by irradiating the subject with two types of radiation having different energy distributions by using the fact that an attenuation amount of the transmitted radiation differs depending on the substance constituting the subject. The imaging apparatus 1 in the radiography system according to the present embodiment can perform the energy subtraction processing. However, in the first embodiment, since a composition ratio of the subject is derived, the detailed description of the energy subtraction processing will be omitted.

The first and second radiation detectors 5 and 6 can perform recording and reading-out of the radiation image repeatedly. A so-called direct-type radiation detector that directly receives emission of the radiation and generates an electric charge may be used, or a so-called indirect-type radiation detector that converts the radiation into visible light and then converts the visible light into an electric charge signal may be used. In addition, as a method for reading out a radiation image signal, it is desirable to use a so-called thin film transistor (TFT) readout method in which the radiation image signal is read out by turning a TFT switch on and off, or a so-called optical readout method in which the radiation image signal is read out by emission of read out light. However, other methods may also be used without being limited to these methods.

Figure 2:
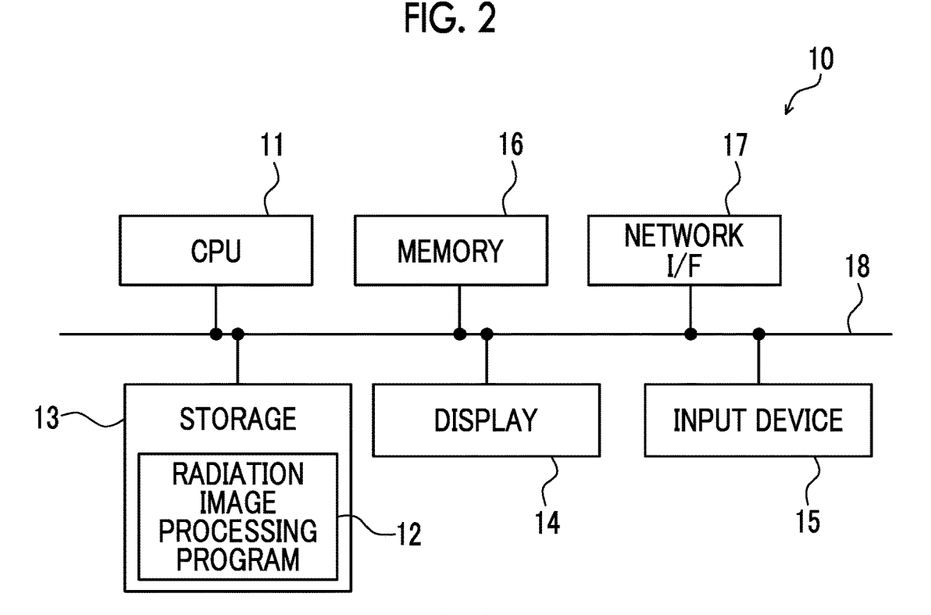
FIG. 2 is a diagram showing a schematic configuration of the radiation image processing device according to the first embodiment.

Hereinafter, the radiation image processing device according to the first embodiment will be described. First, with reference to FIG. 2, a hardware configuration of the radiation image processing device according to the first embodiment will be described. As shown in FIG. 2, the radiation image processing device 10 is a computer, such as a workstation, a server computer, and a personal computer, and comprises a central processing unit (CPU) 11, a non-volatile storage 13, and a memory 16 as a transitory storage region. In addition, the radiation image processing device 10 comprises a display 14, such as a liquid crystal display, an input device 15, such as a keyboard and a mouse, and a network interface (I/F) 17 connected to a network (not shown). The CPU 11, the storage 13, the display 14, the input device 15, the memory 16, and the network I/F 17 are connected to a bus 18. Note that the CPU 11 is an example of a processor according to the present disclosure.

The storage 13 is realized by a hard disk drive (HDD), a solid state drive (SSD), a flash memory, and the like. A radiation image processing program 12 installed in the radiation image processing device 10 is stored in the storage 13 as a storage medium. The CPU 11 reads out the radiation image processing program 12 from the storage 13, expands the read out radiation image processing program 12 to the memory 16, and executes the expanded radiation image processing program 12.

Note that the radiation image processing program 12 is stored in a storage device of the server computer connected to the network or in a network storage in a state of being accessible from the outside, and is downloaded and installed in the computer that configures the radiation image processing device 10 in response to the request. Alternatively, the radiation image processing program 12 is distributed in a state of being recorded on a recording medium, such as a digital versatile disc (DVD) or a compact disc read only memory (CD-ROM), and is installed in the computer that configures the radiation image processing device 10 from the recording medium.

Figure 3:
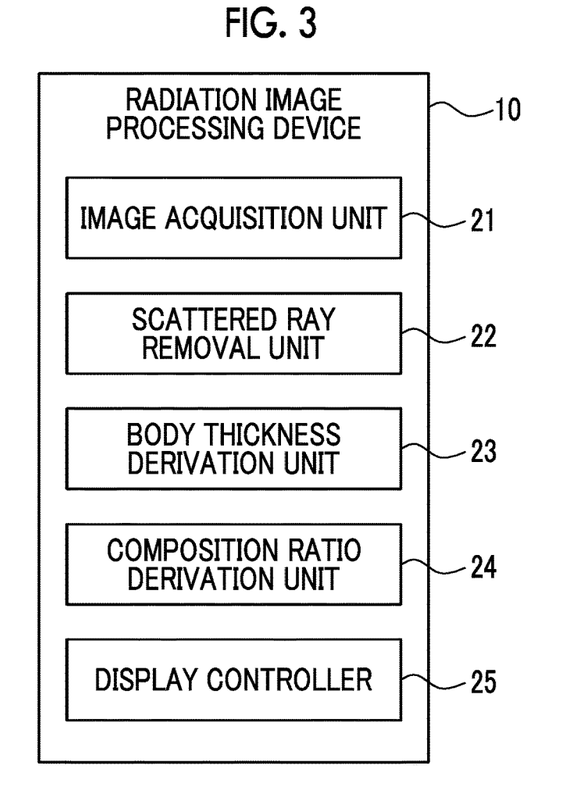
FIG. 3 is a diagram showing a functional configuration of the radiation image processing device according to the first embodiment.

Next, a functional configuration of the radiation image processing device according to the first embodiment will be described. FIG. 3 is a diagram showing a functional configuration of the radiation image processing device according to the first embodiment. As shown in FIG. 3, the radiation image processing device 10 comprises an image acquisition unit 21, a scattered ray removal unit 22, a body thickness derivation unit 23, a composition ratio derivation unit 24, and a display controller 25. Moreover, by executing the radiation image processing program 12, the CPU 11 functions as the image acquisition unit 21, the scattered ray removal unit 22, the body thickness derivation unit 23, the composition ratio derivation unit 24, and the display controller 25. Note that, in the first embodiment, a composition ratio of fat is derived as the composition ratio. Therefore, although the subject H includes the bone part, for the sake of description, the description will be made on assumption that the bone part is not included and only the soft part is included in the first and second radiation images G1 and G2.

The image acquisition unit 21 acquires the first radiation image G1 and the second radiation image G2 of the subject H from the first and second radiation detectors 5 and 6 by causing the imaging apparatus 1 to perform the energy subtraction imaging of the subject H. The imaging conditions are set as described above in a case of the acquisition of the first radiation image G1 and the second radiation image G2.

The scattered ray removal unit 22 removes the scattered ray component generated by the scattering of the radiation in the subject H, which is included in the first and second radiation images G1 and G2. As a method for removing the scattered ray component, for example, any method disclosed in JP2014-207958A, can be used. The method disclosed in JP2014-207958 is a method for acquiring a characteristic of a grid that is assumed to be used to remove the scattered rays during the imaging of the radiation image, deriving the scattered ray component included in the radiation image based on the characteristic, and performing scattered ray removal processing by using the derived scattered ray component. Note that, in the first and second radiation images G1 and G2 in the subsequent processing, the scattered ray components are removed.

The body thickness derivation unit 23 derives the body thicknesses of the subject H, as a first body thickness and a second body thickness, respectively, for each pixel of each of the first and second radiation images G1 and G2 from which the scattered ray components are removed. Specifically, the body thickness derivation unit 23 derives a first body thickness t1 of the subject H by assuming that a brightness distribution of the first radiation image G1 coincides with the body thickness distribution of the subject H, and converting the pixel value of the first radiation image G1 into the thickness by using an attenuation coefficient of the muscle of the subject H. In addition, the body thickness derivation unit 23 derives a second body thickness t2 of the subject H by assuming that a brightness distribution of the second radiation image G2 coincides with the body thickness distribution of the subject H, and converting the pixel value of the second radiation image G2 into the thickness by using the attenuation coefficient of the muscle of the subject H.

Here, the radiation emitted from the radiation source 3 has an energy distribution, an attenuation coefficient of the radiation in the subject H is also dependent on the energy of the radiation, and the attenuation coefficient has a characteristic of being less as the energy component is higher. For this reason, a phenomenon called beam hardening occurs in which the radiation loses a relatively large amount of low-energy components in the process of transmitting the substance, and the proportion of high-energy components is increased. A degree of beam hardening depends on a fat thickness tf and a muscle thickness tm in the subject H. The degree of beam hardening also depends on an order of the substances through which the radiation is transmitted in the subject H. That is, in a case in which the radiation is transmitted through fat first, the attenuation coefficient of the fat depends only on the fat thickness tf, but the attenuation coefficient of the muscle through which the radiation is transmitted next to the fat also depends on the fat thickness tf in addition to the muscle thickness tm. Therefore, the attenuation coefficient $\mu f$ of the fat can be defined as $\mu f(tf)$ as a non-linear function of the fat thickness tf, and the attenuation coefficient $\mu m$ of the muscle can be defined as $\mu m(tf, tm)$ as non-linear functions of the fat thickness tf and the muscle thickness tm.

Here, a soft tissue of the subject H includes muscle, fat, blood, and water. In the present embodiment, a tissue other than the fat in the soft tissue is regarded as the muscle. That is, in the present embodiment, it is assumed that the muscle includes non-fat tissue including blood and water.

As in the present embodiment, the first and second radiation images G1 and G2 acquired by the radiation having two different energy distributions correspond to a low-energy image and a high-energy image, respectively. Therefore, in the present embodiment, the attenuation coefficient of the fat of the first radiation image G1, which is the low-energy image, can be represented as μlf(tf), and the attenuation coefficient of the muscle can be represented as μlm(tf, tm). In addition, the attenuation coefficient of the fat of the second radiation image G2, which is the high-energy image, can be represented as μhf(tf), and the attenuation coefficient of the muscle can be represented as μhm(tf, tm).

In addition, the pixel value G1(x,y) of each pixel of the first radiation image G1, which is the low-energy image, and the pixel value G2(x,y) of each pixel of the second radiation image G2, which is the high-energy image, are represented by Expression (1) and Expression (2) by using the fat thickness tf(x,y), the muscle thickness tm(x,y), and the attenuation coefficients μlf(x,y), μhf(x,y), μlm(x,y), and μhm (x,y) at the corresponding pixel positions. Note that, in Expression (1) and Expression (2), the description of (x,y) is omitted.

$$G1=\mu lf \times tf + \mu lm \times tm \quad (1)$$

$$G2=\mu hf \times tf + \mu hm \times tm \quad (2)$$

As described above, in the present embodiment, in a case in which the first body thickness t1 and the second body thickness t2 are derived, the pixel values of the first radiation image G1 and the second radiation image G2 are converted into the thicknesses by using the attenuation coefficient of the muscle in the subject H. Therefore, in the first embodiment, the body thickness derivation unit 23 derives the first body thickness t1 and the second body thickness t2 by Expression (3) and Expression (4). Note that the first body thickness t1 and the second body thickness t2 are derived in each pixel (x,y) of the first and second radiation images G1 and G2, but the description of (x,y) is omitted in Expression (3) and Expression (4).

$$t1=G1/\mu lm \quad (3)$$

$$t2=G2/\mu hm \quad (4)$$

Figure 4:
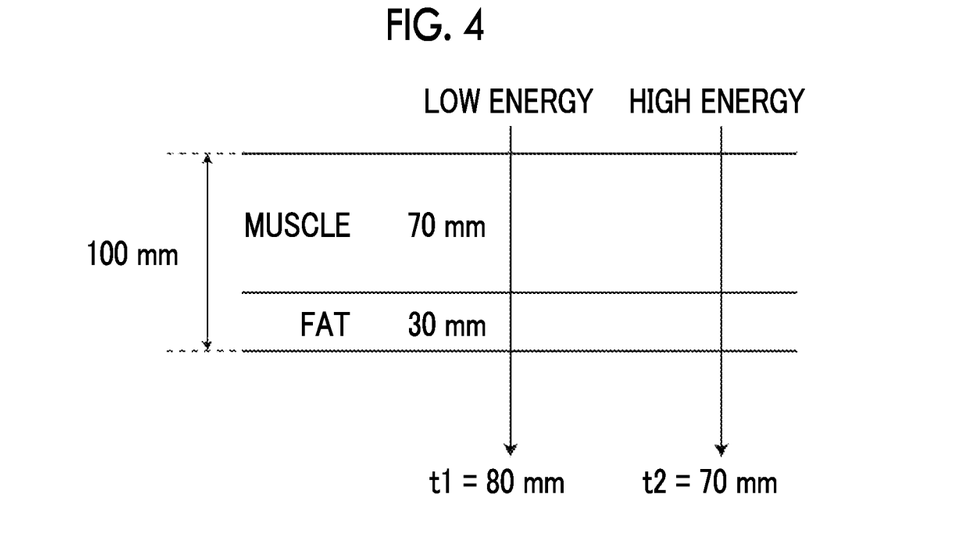
FIG. 4 is a diagram for describing a difference between body thicknesses derived from a low-energy image and a high-energy image.

In a case in which the subject H includes only the muscle at the pixel positions at which the first and second body thicknesses t1 and t2 are derived, the first body thickness t1 and the second body thickness t2 coincide with each other. However, in the actual subject H, the muscle and the fat are both included at the same pixel positions of the first and second radiation images G1 and G2. Therefore, the first and second body thicknesses t1 and t2 derived by Expression (3) and Expression (4) do not coincide with the actual body thickness of the subject H. In addition, in the first body thickness t1 derived from the first radiation image G1, which is the low-energy image, and the second body thickness t2 derived from the second radiation image G2, which is the high-energy image, the first body thickness t1 is a larger value than the second body thickness t2. For example, as shown in FIG. 4, it is assumed that the actual body thickness is 100 mm and the fat thickness and the muscle thickness are 30 mm and 70 mm, respectively. In this case, the first body thickness t1 derived from the first radiation image G1 acquired by the low-energy radiation is derived as, for example, 80 mm, and the second body thickness t2 derived by the second radiation image G2 acquired by the high-energy radiation is derived as, for example, 70 mm. Also, a difference between the first body thickness t1 and the second body thickness t2 is larger as the composition ratio of the fat is larger.

Here, the difference between the first body thickness t1 and the second body thickness t2 is changed according to the composition ratio of the fat and the muscle in the subject H. Therefore, in the present embodiment, a subject model in which the composition ratio of the fat is variously changed is imaged with the radiation having different energy distributions, the body thicknesses are derived from the two radiation images acquired in this way, respectively, and a table in which the difference between the body thicknesses derived from the two radiation images and the composition ratio of the fat are associated with each other is created in advance and stored in the storage 13.

Figure 5:
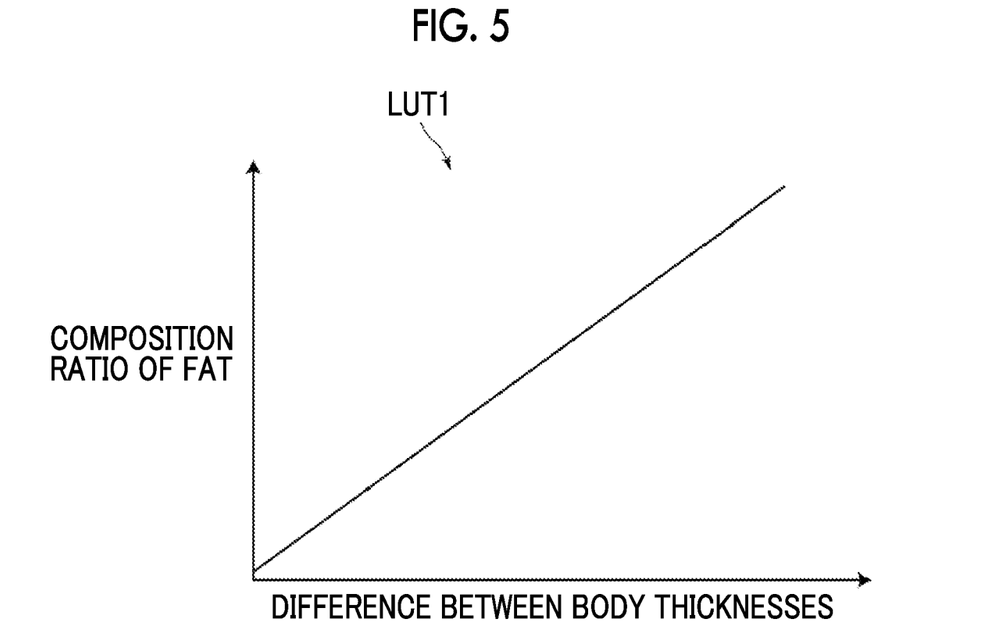
FIG. 5 is a diagram showing a table defining a relationship between a difference between the body thicknesses and a composition ratio of fat.

FIG. 5 is a diagram showing the table in which the difference between the body thicknesses derived from the two radiation images and the composition ratio of the fat are associated with each other. As shown in FIG. 5, in a table LUT1, a horizontal axis is the difference between the body thicknesses derived from the two radiation images, and a vertical axis is the composition ratio of the fat. As shown in FIG. 5, the composition ratio of the fat is larger as the difference between the body thicknesses derived from the two radiation images is larger. Note that the table in which the difference between the body thicknesses derived from the two radiation images and the composition ratio of the fat are associated with each other is prepared for each radiation energy distribution used during the imaging of and stored in the storage 13.

Here, in the present embodiment, the attenuation coefficient in consideration of the influence of the beam hardening according to the order in which the radiation is transmitted through the fat and the muscle is used. On the other hand, in the subject H, since the fat and the muscle are mixed, the fat and the muscle having various thicknesses are alternately present on a transmission path of the radiation. However, even in a case in which the disposition of the muscle and the fat is changed under the condition that the muscle thickness and the fat thickness of the entire subject H are fixed, the attenuation coefficient for each energy is decided depending on the substance, and thus the radiation spectrum transmitted through the entire subject H is the same.

Figure 6:
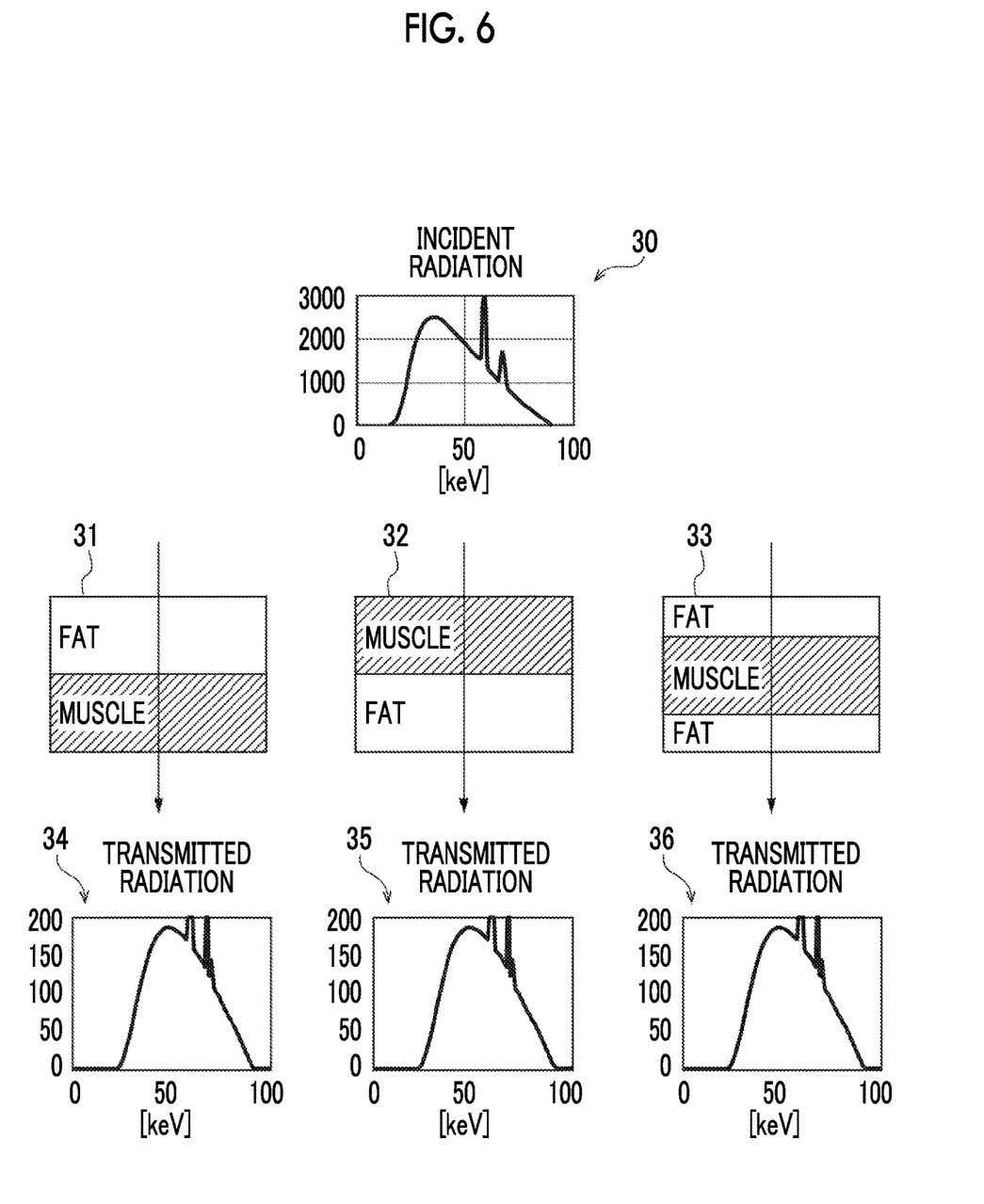
FIG. 6 is a diagram for describing that an energy distribution of radiation is not changed by the disposition of muscle and fat.

FIG. 6 is a diagram for describing that the energy distribution of the radiation is not changed by the disposition of the muscle and the fat. As shown in FIG. 6, a subject 31 in which the fat having a thickness tf1 and the muscle having a thickness tm2 are arranged in this order, a subject 32 in which the muscle having the thickness tm2 and the fat having the thickness tf1 are arranged in this order, and a subject 33 in which the fat having a thickness tf11, the muscle having the thickness tm2, the fat having a thickness tf12 are arranged in this order are considered. Note that it is assumed that tf1=tf11+tf12. The three subjects 31 to 33 are irradiated with the radiation having an energy distribution 30. In the energy distribution 30, a horizontal axis represents the energy of the radiation and a vertical axis represents the number of photons of the radiation. An energy distribution 34 of the radiation after being transmitted through the subject 31, an energy distribution 35 of the radiation after being transmitted through the subject 32, and an energy distribution 36 of the radiation after being transmitted through the subject 33 are the same. This configuration is because the attenuation coefficient for each energy is decided depending on the substance even in a case in which the disposition of the fat and the muscle is changed.

For this reason, in the present embodiment, the composition is obtained by regarding the subject H as a model that is divided into two parts such that the fat and the muscle each are grouped together to have one thickness.

The composition ratio derivation unit 24 derives a difference between the first body thickness t1 and the second body thickness t2 derived by the body thickness derivation unit 23, and derives the composition ratio of the fat with reference to the table LUT1 stored in the storage 13. Note that the composition ratio of the muscle can be derived by subtracting the derived composition ratio of the fat from 100%.

Figure 7:
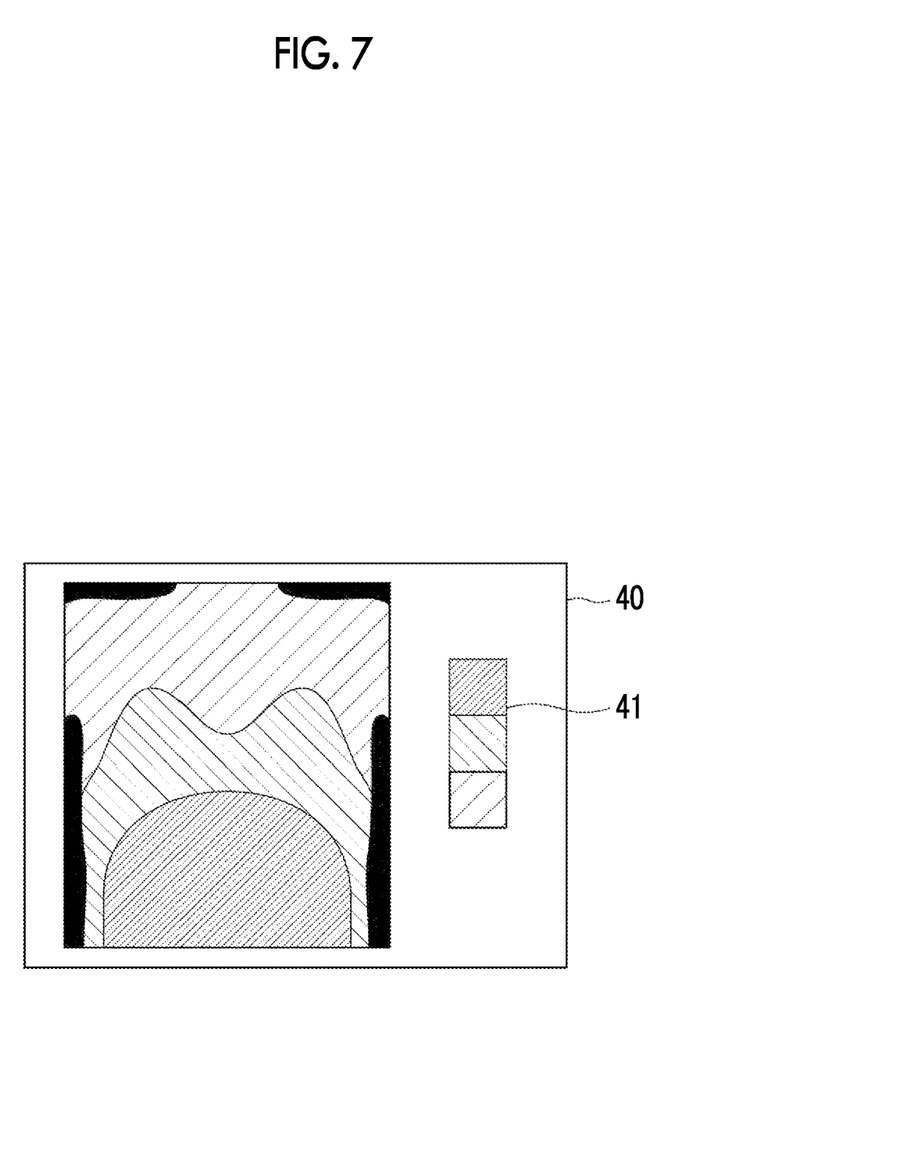
FIG. 7 is a diagram showing a display screen of a body fat percentage.

The display controller 25 displays a composition distribution of the fat on the display 14 based on the composition ratio of the fat for each pixel of the first and second radiation images G1 and G2 derived by the composition ratio derivation unit 24. FIG. 7 is a diagram showing a display screen of the composition distribution of the fat displayed on the display 14. As shown in FIG. 7, a display screen 40 displays the composition distribution of the fat in a superimposed manner on the first radiation image G1 as a body fat percentage distribution. Note that the body fat percentage distribution may be superimposed on the second radiation image G2. Note that, in FIG. 7, the body fat percentage distribution is displayed in three stages of color coding. Note that, in FIG. 7, the color coding is represented by a difference in concentration, and the body fat percentage is higher as the concentration is higher. In addition, a reference 41 representing a relationship between the concentration and the body fat percentage is displayed on the display 14. With reference to the reference 41, the distribution of the body fat percentage can be easily recognized.

Figure 8:
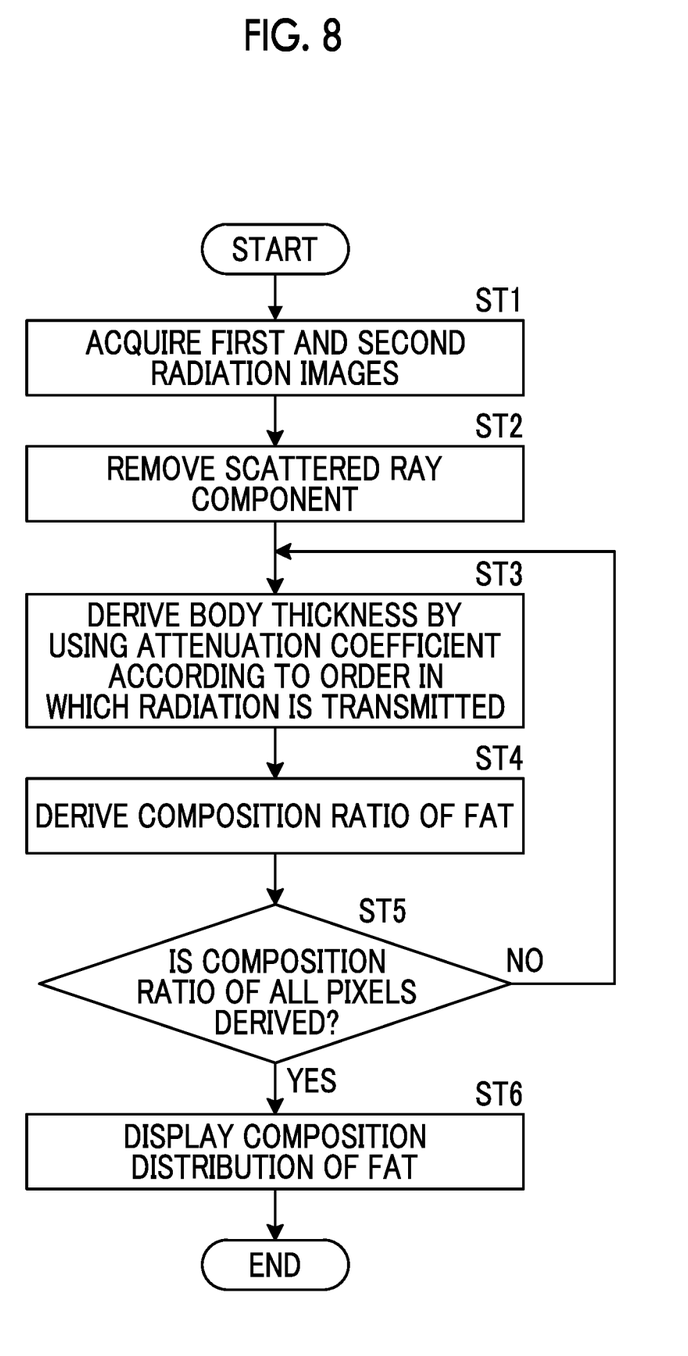
FIG. 8 is a flowchart showing processing performed in the first embodiment.

Hereinafter, processing performed in the first embodiment will be described. FIG. 8 is a flowchart showing the processing performed in the first embodiment. Note that the first and second radiation images G1 and G2 are acquired by the imaging and stored in the storage 13. In a case in which an instruction for starting the processing is input from the input device 15, the image acquisition unit 21 acquires the first and second radiation images G1 and G2 from the storage 13 (step ST1). Then, the scattered ray removal unit 22 removes the scattered ray components from the first and second radiation images G1 and G2 (step ST2). Further, the body thickness derivation unit 23 derives the body thicknesses of the subject H, as the first body thickness t1 and the second body thickness t2, respectively, for each pixel of each of the first and second radiation images G1 and G2 from which the scattered ray components are removed, by using the attenuation coefficient according to the order in which the radiation is transmitted through the fat and the muscle (step ST3).

Subsequently, the composition ratio derivation unit 24 derives the difference between the first body thickness t1 and the second body thickness t2 derived by the body thickness derivation unit 23, and derives the composition ratio of the fat with reference to the table LUT1 stored in the storage 13 (step ST4). Then, the composition ratio derivation unit 24 determines whether or not the composition ratio of all the pixels is derived (step ST5), and returns to step ST3 in a case in which a negative determination is made in step ST5. In a case in which a positive determination is made in step ST5, the display controller 25 displays the composition distribution of the fat based on the composition ratio of the fat derived by the composition ratio derivation unit 24 on the display 14 (step ST6), and the processing is terminated.

As described above, in the first embodiment, the body thicknesses of the subject H are derived as the first body thickness t1 and the second body thickness t2 for each pixel of each of the first and second radiation images G1 and G2 by using the attenuation coefficient according to the order in which the radiation is transmitted through the fat and the muscle, and the composition ratio of the subject H is derived based on the difference between the first body thickness t1 and the second body thickness t2. Therefore, it is possible to derive the first body thickness t1, the second body thickness t2, and further the fat ratio in consideration of the influence of the beam hardening according to the order of the substances through which the radiation is transmitted in the subject H. Therefore, according to the present embodiment, it is possible to derive the composition ratio in the subject with high accuracy.

In addition, since the composition is obtained by regarding the subject H as the model that is divided into two parts such that the fat and the muscle each are grouped together to have one thickness, the composition can be derived by a relatively simple calculation. Therefore, according to the present embodiment, it is possible to derive the composition ratio of the subject H in a short processing time.

Note that, in the first embodiment, the body thickness derivation unit 23 derives the first and second body thicknesses t1 and t2 by converting the pixel values of the first and second radiation images G1 and G2 into the thickness by using the attenuation coefficient of the muscle, but the present disclosure is not limited to this. The first and second body thicknesses t1 and t2 may be derived by converting the pixel values of the first and second radiation images G1 and G2 into the thicknesses by using the attenuation coefficient of the fat. In this case, a table in which the difference between the body thicknesses derived from the two radiation images and the composition ratio of the muscle are associated with each other is created in advance and stored in the storage 13. Then, the composition ratio derivation unit 24 need only derive the composition ratio of the muscle with reference to a table in which the difference between the body thicknesses derived from the two radiation images and the composition ratio of the muscle are associated with each other. In this case, the composition ratio of the fat can be derived by subtracting the derived composition ratio of the muscle from 100%.

Hereinafter, a second embodiment of the present disclosure will be described. Note that a radiation image processing device according to the second embodiment has the same configuration as the radiation image processing device according to the first embodiment according to the present disclosure shown in FIG. 3, and only the processing to be performed is different. For this reason, the detailed description of the device will be omitted here. The radiation image processing device according to the second embodiment is different from the first embodiment in that the body thickness derivation unit 23 derives the first body thickness t1 and the second body thickness t2 by using the attenuation coefficient according to the order in which the radiation is transmitted through the plurality of compositions, and the composition ratio derivation unit 24 changes the thickness of the composition and the attenuation coefficient for each composition, causes the body thickness derivation unit 23 to derive the first body thickness t1 and the second body thickness t2 by using the changed thickness of the composition and the changed attenuation coefficient for each composition, and derives the composition ratio based on the thickness of the composition in which the difference between the first body thickness t1 and the second body thickness t2 is equal to or less than a predetermined threshold value Th1.

Here, the first body thickness t1 is an addition value of the fat thickness tf and the muscle thickness tm, that is, t1=tf+tm. Since tm=t1−tf, Expression (1) can be transformed into Expression (5). Note that the description of (x,y) is also omitted in Expression (5) to Expression (7).

$$G1=\mu lf \times tf + \mu lm \times (t1-tf) \quad (5)$$

In a case in which Expression (5) is solved for t1, Expression (6) is obtained.

$$t1=\{G1+(\mu lm-\mu lf)\times tf\}/\mu lm \quad (6)$$

In addition, since the second body thickness is t2=tf+tm, in a case in which Expression (2) is transformed in the same manner as in Expression (5) and solved for t2, Expression (7) is obtained.

$$t2=\{G2+(\mu hm-\mu hf)\times tf\}/\mu hm \quad (7)$$

By deriving the fat thickness tf such that the difference between t1 and t2 is small, preferably t1=t2, the composition ratio of the fat can be derived. However, since the attenuation coefficients μlf and μhf are non-linear functions of the fat thickness tf, and μlm and μhm are non-linear functions of the fat thickness tf and the muscle thickness tm, the fat thickness tf cannot be derived algebraically from Expression (6) and Expression (7). Therefore, in the second embodiment, the composition ratio derivation unit 24 changes the fat thickness tf and the attenuation coefficients μlf, μhf, μlm, and μhm and causes the body thickness derivation unit 23 to derive the first body thickness t1 and the second body thickness t2 by using the changed fat thickness tf and the changed attenuation coefficients μlf, μhf, μlm, and μhm. Then, the composition ratio derivation unit 24 derives the fat thickness tf in which the difference between the first body thickness t1 and the second body thickness t2 is equal to or less than the predetermined threshold value Th1, that is, |t1−t2|≤Th1, and derives the composition ratio of the fat based on the fat thickness tf. Note that the threshold value Th1 is preferably as small as possible, and more preferably Th1=0.

Specifically, in a case in which tf=0 and t1=t2, all the pixels (x,y) are the muscle. Further, in a case in which tf=0 and t1≠t2, the composition ratio derivation unit 24 derives the fat thickness tf by searching for the fat thickness tf such that |t1−t2|≤Th1 while changing the fat thickness tf. Then, the composition ratio derivation unit 24 derives the composition ratio of the fat by dividing the derived fat thickness tf by the first body thickness t1 or the second body thickness t2. Note that the composition ratio of the muscle can be derived by subtracting the derived composition ratio of the fat from 100%.

Figure 9:
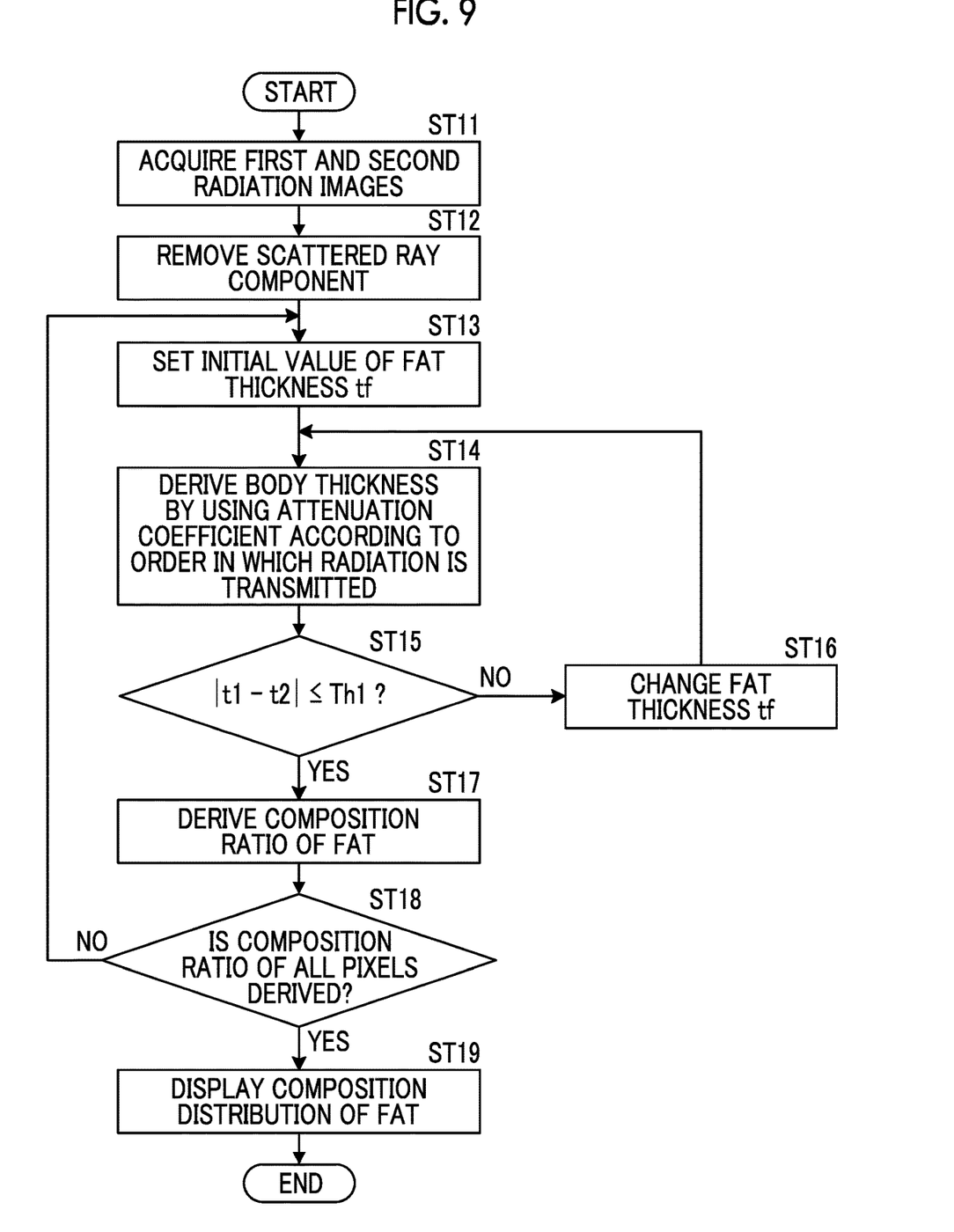
FIG. 9 is a flowchart showing processing performed in a second embodiment.

Hereinafter, processing performed in the second embodiment will be described. FIG. 9 is a flowchart showing the processing performed in the second embodiment. Note that the first and second radiation images G1 and G2 are acquired by the imaging and stored in the storage 13. In a case in which an instruction for starting the processing is input from the input device 15, the image acquisition unit 21 acquires the first and second radiation images G1 and G2 from the storage 13 (step ST11). Then, the scattered ray removal unit 22 removes the scattered ray components from the first and second radiation images G1 and G2 (step ST12). Further, the body thickness derivation unit 23 sets an initial value of the fat thickness tf (step ST13), and derives the body thicknesses of the subject H, as the first body thickness t1 and the second body thickness t2, respectively, for each pixel of each of the first and second radiation images G1 and G2 from which the scattered ray components are removed, by using the attenuation coefficient according to the order in which the radiation is transmitted through the fat and the muscle (step ST14). Note that the composition ratio derivation unit 24 may set the initial value of the fat thickness tf.

Subsequently, the composition ratio derivation unit 24 determines whether or not |t1−t2|≤Th1 (step ST15), changes the fat thickness tf in a case in which a negative determination is made in step ST15 (step ST16), and returns to step ST14. In a case in which a positive determination is made in step ST15, the composition ratio derivation unit 24 derives the composition ratio of the fat based on the fat thickness tf in a case in which a positive determination is made in step ST15 (step ST17). Then, the composition ratio derivation unit 24 determines whether or not the composition ratio of all the pixels is derived (step ST18), and returns to step ST13 in a case in which a negative determination is made in step ST18. In a case in which a positive determination is made in step ST18, the display controller 25 displays the composition distribution of the fat based on the composition ratio of the fat derived by the composition ratio derivation unit 24 on the display 14 (step ST19), and the processing is terminated.

As described above, even in the second embodiment, it is possible to derive the composition ratio in the subject with high accuracy.

In particular, in the second embodiment, the composition is obtained by regarding the subject H as the model that is divided into two parts such that the fat and the muscle each are grouped together to have one thickness. Therefore, as compared with a case in which the fat thickness, the muscle thickness, and the disposition thereof are simultaneously obtained in a case in which the composition is derived by performing the repetitive calculation as in the second embodiment, it is possible to prevent the desired fat thickness tf from being diverged, an error from the actual fat thickness being large, and the processing time being long. That is, by reducing unnecessary variables used in the calculation expression in the repetitive processing of deriving the body thickness, it is possible to increase the probability of converging to the optimum solution in a shorter time than in the related-art method.

Note that, in the second embodiment, the composition ratio of the fat is derived based on the fat thickness tf, but the composition ratio of the muscle may be derived based on the muscle thickness tm. In this case, tf=t1−tm, and in a case in which t1 is derived based on Expression (1), Expression (8) is obtained. Further, in a case in which Expression (2) is solved for t2, Expression (9) is obtained. Note that the description of (x,y) is also omitted in Expression (8) and Expression (9).

$$t1=\{G1+(\mu lf-\mu lm)\times tm\}/\mu lf \quad (8)$$

$$t2=\{G2+(\mu hf-\mu hm)\times tm\}/\mu hf \quad (9)$$

In this case, the composition ratio derivation unit 24 derives the muscle thickness tm by searching for tm in which the difference between the first body thickness t1 and the second body thickness t2 is equal to or less than a predetermined threshold value Th2, that is, |t1−t2|≤Th2, and derives the composition ratio of the muscle by dividing the derived muscle thickness tm by the first body thickness t1 or the second body thickness t2.

In addition, in each of the embodiments described above, it is assumed that the radiation is transmitted through the fat first, but the present disclosure is not limited to this. The composition ratio may be derived on the assumption that the radiation is transmitted through the muscle first. In this case, the attenuation coefficient μm of the muscle can be defined as μm(tm) as the non-linear function of the muscle thickness tm, and the attenuation coefficient μf of the fat can be defined as μf(tf, tm) as the non-linear functions of the fat thickness tf and the muscle thickness tm. Therefore, the attenuation coefficient of the fat for the first radiation image G1, which is the low-energy image, can be represented as μlf(tf, tm), and the attenuation coefficient of the muscle can be represented as μlm(tm). In addition, the attenuation coefficient of the fat for the second radiation image G2, which is the high-energy image, can be represented as μhf(tf, tm), and the attenuation coefficient of the muscle can be represented as μhm(tm).

Figure 10:
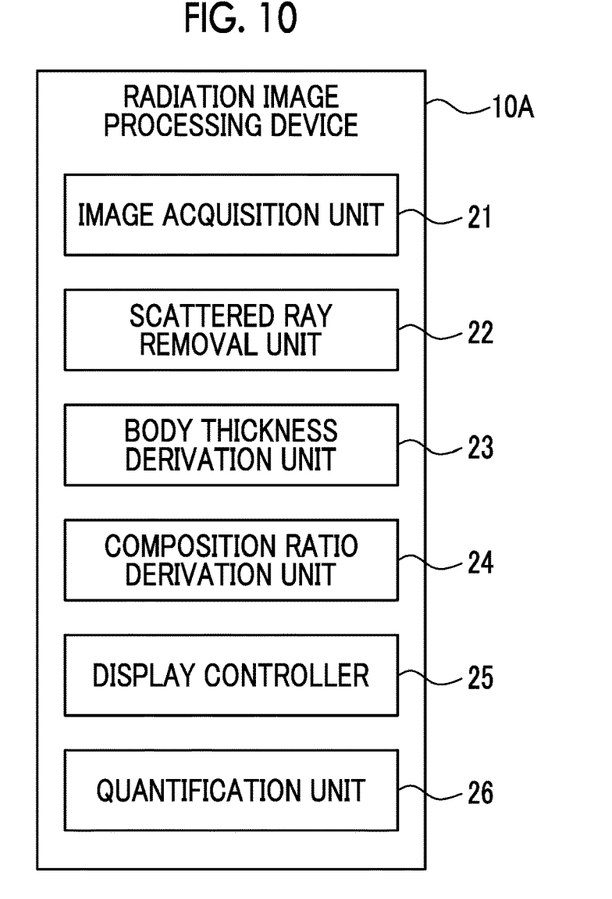
FIG. 10 is a diagram showing a functional configuration of a radiation image processing device according to a third embodiment.

Hereinafter, a third embodiment of the present disclosure will be described. FIG. 10 is a diagram showing a functional configuration of a radiation image processing device according to the third embodiment. Note that, in FIG. 10, the same reference numerals are assigned to the same configurations as those in FIG. 3, and detailed description thereof will be omitted. The third embodiment is different from the first and second embodiments in that a quantification unit 26 is provided.

Figure 11:
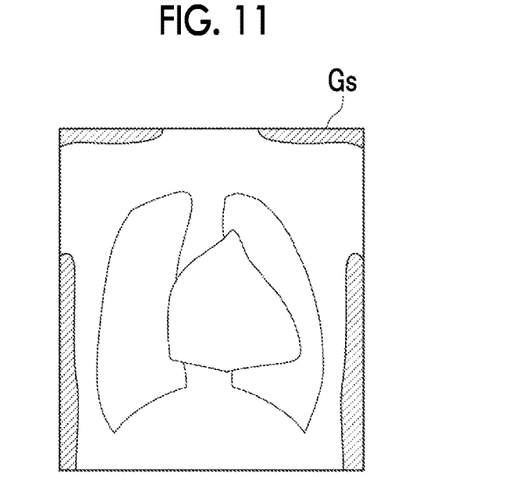
FIG. 11 is a diagram showing a soft part image.

The quantification unit 26 derives a soft part image Gs in which the soft part of the subject H is extracted from the first and second radiation images G1 and G2 from which the scattered ray components are removed by the scattered ray removal unit 22. Specifically, the quantification unit 26 performs weighting subtraction between the corresponding pixels with respect to the first and second radiation images G1 and G2 as shown in Expression (10) to generate the soft part image Gs in which only the soft part of the subject H included in each of the radiation images G1 and G2 is extracted. In Expression (10), β2 is a weighting coefficient. The soft part image Gs is shown in FIG. 11.

$$Gs(x,y)=G1(x,y)-\beta2 \times G2(x,y) \quad (10)$$

Figure 12:
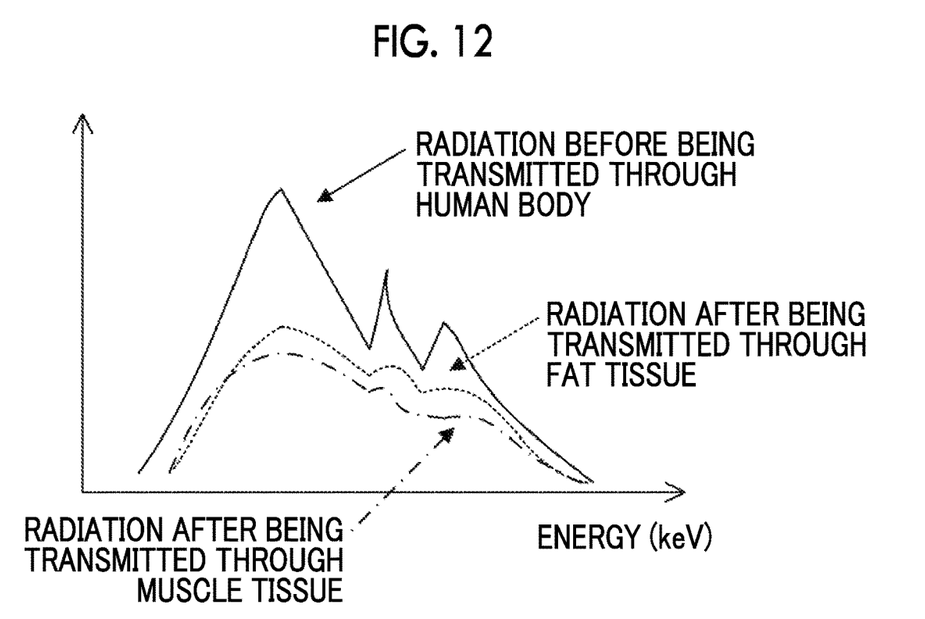
FIG. 12 is a diagram showing an example of energy spectra of radiation after being transmitted through a muscle tissue and radiation after being transmitted through a fat tissue.

The quantification unit 26 derives a muscle mass based on the pixel value for each pixel in a soft region in the soft part image Gs. The quantification unit 26 separates the muscle and the fat from the soft part image Gs by using a difference in an energy characteristic between a muscle tissue and a fat tissue. As shown in FIG. 12, a dose of the radiation after being transmitted through the subject H, which is the human body, is lower than a dose of the radiation before being incident on the subject H. In addition, since the energy absorbed by the muscle tissue and the energy absorbed by the fat tissue are different and attenuation coefficients are different, the energy spectra of the radiation after being transmitted through the muscle tissue and the radiation after being transmitted through the fat tissue in the radiation after being transmitted through the subject H are different. As shown in FIG. 12, the energy spectrum of the radiation transmitted through the subject H and emitted to each of the first radiation detector 5 and the second radiation detector 6 depends on the body composition of the subject H, specifically, a ratio between the muscle tissue and the fat tissue. Since the fat tissue is more likely to transmit the radiation than the muscle tissue, the dose of the radiation after being transmitted through the human body is less in a case in which the ratio of the muscle tissue is larger than the fat tissue.

Therefore, the quantification unit 26 separates the muscle and the fat from the soft part image Gs by using the difference in the energy characteristic between the muscle tissue and the fat tissue described above. That is, the quantification unit 26 generates a muscle image and a fat image from the soft part image Gs. Also, the quantification unit 26 derives the muscle mass of each pixel based on the pixel value of the muscle image.

Specifically, the quantification unit 26 generates the muscle image from the soft part image Gs according to Expression (11). In Expression (11), rm(x,y) is the composition ratio of the muscle derived by the composition ratio derivation unit 24. In addition, the quantification unit 26 generates the fat image from the soft part image Gs according to Expression (12). In Expression (12), rf(x,y) is the composition ratio of the fat derived by the composition ratio derivation unit 24.

$$Gm(x,y)=rm(x,y) \times Gs(x,y) \quad (11)$$

$$Gf(x,y)=rf(x,y) \times Gs(x,y) \quad (12)$$

Further, as shown in Expression (13), the quantification unit 26 derives a muscle mass $M(x,y)$ (g/cm$^2$) for each pixel of a muscle image Gm by multiplying each pixel (x,y) of the muscle image Gm by a coefficient C1(x,y) representing a relationship between a predetermined pixel value and the muscle mass. In addition, as shown in Expression (14), the quantification unit 26 derives a fat mass $F(x,y)$ (g/cm$^2$) for each pixel of a fat image Gf by multiplying each pixel (x,y) of the fat image Gf by a coefficient C2(x,y) representing a relationship between a predetermined pixel value and the fat mass.

$$M(x,y)=C1(x,y) \times Gm(x,y) \quad (13)$$

$$F(x,y)=C2(x,y) \times Gf(x,y) \quad (14)$$

Figure 13:
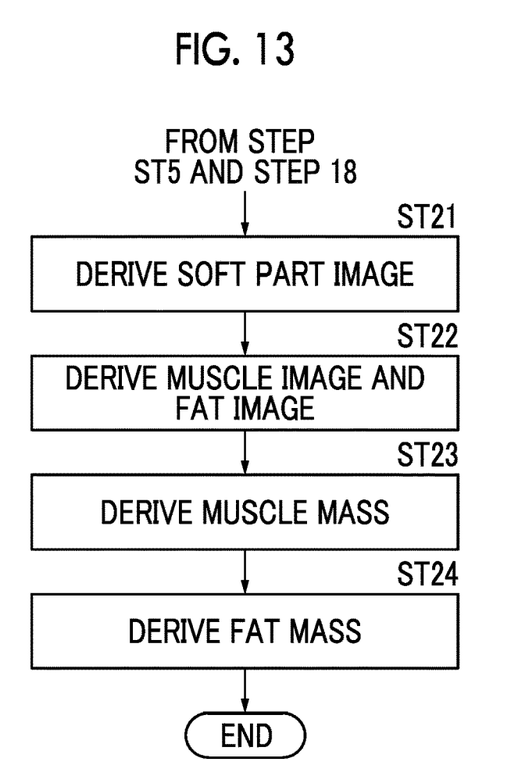
FIG. 13 is a flowchart showing processing performed in the third embodiment.

Hereinafter, processing performed in the third embodiment will be described. FIG. 13 is a flowchart showing the processing performed in the third embodiment. Note that, in FIG. 13, processing after step ST5 in the flowchart of the first embodiment shown in FIG. 8 or step ST18 in the flowchart of the second embodiment shown in FIG. 9 will be described.

Following step ST5 or step ST18, the quantification unit 26 derives the soft part image Gs from the first and second radiation images (step ST21). Then, the quantification unit 26 derives the muscle image Gm and the fat image Gf from the soft part image Gs (step ST22). Further, the quantification unit 26 derives the muscle mass from the muscle image Gm (step ST23), derives the fat mass from the fat image Gf (step ST24), and the processing is terminated.

Here, in the third embodiment, the display controller 25 may display the distributions of the derived muscle mass and fat mass on the display 14. For example, since the distribution of the fat mass correlates with the distribution of the body fat percentage, the display screen is similar to the body fat percentage shown in FIG. 7.

Note that, in the third embodiment, the fat thickness tf and the muscle thickness tm may be derived by the method according to the second embodiment, and the fat image Gf and the muscle image Gm may be derived by using the attenuation coefficient μ based only on the fat thickness tf and the muscle thickness tm. Specifically, the fat image Gf and the muscle image Gm need only be derived from Expression (15) and Expression (16). Here, μf(tf) is the attenuation coefficient of the fat based only on the fat thickness tf, and μm(tm) is the attenuation coefficient of the muscle based only on the muscle thickness tm. Note that the description of (x,y) is also omitted in Expression (15) and Expression (16).

$$Gf=I0 \times \exp(-\mu f(tf) \cdot tf) \quad (15)$$

$$Gm = I0 \times \exp(-\mu m(tm) \cdot tm) \quad (16)$$

Note that, in Expression (15) and Expression (16), I0 is the reaching dose I0 of the radiation emitted from the radiation source 3 and reaching the radiation detector 5 in a case in which the radiation source 3 is driven to emit the radiation to the radiation detector 5 in a state in which the subject H is not present. The reaching dose I0 is represented by Expression (17). In Expression (17), mAs is a dose and kV is a tube voltage. Here, F is a linear or non-linear function that represents a radiation dose that reaches the radiation detector 5 in a case in which the dose (for example, 1 mAs), which is a standard, is emitted to the radiation detector 5 at the SID (for example, 100 cm), which is a standard, in a state in which the subject H is not present. F is changed depending on the tube voltage. Also, since the reaching dose I0 is derived for each pixel of the radiation image G0 acquired by the radiation detector 5, (x,y) represents the pixel position of each pixel.

$$I0(x,y) = mAs \times F(kV)/SID^2 \quad (17)$$

Note that a dose sensor for detecting the reaching dose may be provided in the radiation detector 5, and the reaching dose I0 may be acquired by the dose sensor. In this case, the dose sensor may be provided in the radiation detector 5 by substituting a part of the image sensor of the radiation detector 5, and the dose sensor may be provided outside a detection surface of the image in the radiation detector 5.

Note that, in each of the embodiments described above, the composition ratio between the fat and the muscle of the subject H is derived, but the present disclosure is not limited to this. The technology of the present disclosure can also be applied in a case in which the composition ratio between the bone part of the subject H and the soft part other than the bone part is derived. In this case as well, in a case of deriving the first body thickness t1 and the second body thickness t2, the attenuation coefficient according to the order in which the radiation is transmitted through the bone part and the soft part need only be used. Here, in a case in which the radiation is transmitted through the soft part in the subject H first, an attenuation coefficient μs of the soft part can be defined as μs(ts) as a non-linear function of a soft part thickness ts, and an attenuation coefficient μb of the bone part can be defined as μb(ts, tb) as non-linear functions of the soft part thickness ts and a bone part thickness tb.

In addition, the composition ratio is not limited to the fat and the muscle, and the bone part and the soft part. The technology of the present disclosure can also be applied in a case of deriving a composition ratio between an artificial object, such as artificial bone or silicon embedded in a human body, and a human body tissue, or a composition ratio of fat and mammary gland in a breast. In addition, in a case in which the imaging is performed by injecting the contrast agent into the subject H, the technology of the present disclosure can also be applied in a case in which a composition ratio between the contrast agent and a tissue other than the contrast agent is derived.

Further, in each of the embodiments described above, the scattered ray components are removed from the first and second radiation images G1 and G2 by the scattered ray removal unit 22, but the present disclosure is not limited to this. For example, in a case in which the scattered ray removal grid is used during the imaging, processing of deriving the composition ratio may be performed without removing the scattered ray components from the first and second radiation images G1 and G2. In this case, in the radiation image processing device according to the present embodiment, the scattered ray removal unit 22 is not required.

Further, in each of the embodiments described above, the first and second radiation images G1 and G2 are acquired by the one-shot method, but the first and second radiation images G1 and G2 may be acquired by a so-called two-shot method in which the imaging is performed twice using only one radiation detector. In a case of the two-shot method, a position of the subject H included in the first radiation image G1 and the second radiation image G2 may shift due to a body movement of the subject H. Therefore, in the first radiation image G1 and the second radiation image G2, it is preferable to perform the processing according to the present embodiment after registration of the subject is performed.

In addition, in each of the embodiments described above, the processing of deriving the composition ratio is performed by using the radiation image acquired in the system that captures the radiation images G1 and G2 of the subject H using the first and second radiation detectors 5 and 6, but it is needless to say that the technology of the present disclosure can be applied even in a case in which the first and second radiation images G1 and G2 are acquired using an accumulative phosphor sheet instead of the radiation detector. In this case, the first and second radiation images G1 and G2 need only be acquired by stacking two accumulative phosphor sheets, emitting the radiation transmitted through the subject H, accumulating and recording radiation image information of the subject H in each of the accumulative phosphor sheets, and photoelectrically reading the radiation image information from each of the accumulative phosphor sheets. Note that the two-shot method may also be used in a case in which the first and second radiation images G1 and G2 are acquired by using the accumulative phosphor sheet.

In addition, the radiation in each of the embodiments described above is not particularly limited, and α-rays or γ-rays can be applied in addition to X-rays.

In addition, in each of the embodiments described above, for example, various processors shown below can be used as the hardware structures of processing units that execute various pieces of processing, such as the image acquisition unit 21, the scattered ray removal unit 22, the body thickness derivation unit 23, the composition ratio derivation unit 24, and the display controller 25 of the radiation image processing device 10. As described above, the various processors include, in addition to the CPU that is a general-purpose processor which executes software (program) and functions as various processing units, a programmable logic device (PLD) that is a processor whose circuit configuration can be changed after manufacture, such as a field programmable gate array (FPGA), and a dedicated electrical circuit that is a processor having a circuit configuration which is designed for exclusive use in order to execute a specific processing, such as an application specific integrated circuit (ASIC).

One processing unit may be configured by one of these various processors, or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

The supplementary notes of the present disclosure will be described below.

Supplementary Note 1

A radiation image processing device comprising at least one processor, in which the processor acquires two radiation images based on radiation that is transmitted through a subject including a plurality of compositions and has different energy distributions from each other, derives body thicknesses of the subject as a first body thickness and a second body thickness, respectively, for each pixel for each of the two radiation images by using an attenuation coefficient according to an order in which the radiation is transmitted through the plurality of compositions, and derives a composition ratio of the subject for each pixel of the radiation image based on the first body thickness and the second body thickness.

Supplementary Note 2

The radiation image processing device according to Supplementary Note 1, in which the processor derives the composition ratio by regarding the subject as a model that is divided such that the plurality of compositions each are grouped together to have one thickness.

Supplementary Note 3

The radiation image processing device according to Supplementary Note 1 or 2, in which the processor derives the composition ratio based on a difference between the first body thickness and the second body thickness.

Supplementary Note 4

The radiation image processing device according to any one of Supplementary Notes 1 to 3, in which the processor changes a thickness of the composition and an attenuation coefficient for each composition to derive the first body thickness and the second body thickness by using the changed thickness of the composition and the changed attenuation coefficient for each composition, and derives the composition ratio based on the thickness of the composition in which a difference between the first body thickness and the second body thickness is equal to or less than a predetermined threshold value.

Supplementary Note 5

The radiation image processing device according to any one of Supplementary Notes 1 to 4, in which the processor removes scattered ray components included in the two radiation images, and derives the composition ratio based on the two radiation images from which the scattered ray components are removed.

Supplementary Note 6

The radiation image processing device according to any one of Supplementary Notes 1 to 5, in which the two radiation images are acquired by two radiation detectors stacked on each other by simultaneously irradiating the two radiation detectors with the radiation transmitted through the subject.

Supplementary Note 7

The radiation image processing device according to any one of Supplementary Notes 1 to 6, in which the processor displays a distribution of the composition ratio in a superimposed manner on any one of the two radiation images on a display.

Supplementary Note 8

The radiation image processing device according to any one of Supplementary Notes 1 to 7, in which the plurality of compositions are muscle and fat.

Supplementary Note 9

The radiation image processing device according to any one of Supplementary Notes 1 to 7, in which the plurality of compositions are a bone part and a soft part.

Supplementary Note 10

The radiation image processing device according to any one of Supplementary Notes 1 to 7, in which the plurality of compositions are a contrast agent injected into the subject and a tissue other than the contrast agent.

Supplementary Note 11

The radiation image processing device according to any one of Supplementary Notes 1 to 10, in which the processor derives a composition image for at least one composition of the plurality of compositions based on the two radiation images and the composition ratio.

Supplementary Note 12

The radiation image processing device according to Supplementary Note 11, in which the processor quantifies the composition represented by the composition image based on the composition image.

Supplementary Note 13

A radiation image processing method comprising acquiring two radiation images based on radiation that is transmitted through a subject including a plurality of compositions and has different energy distributions from each other, deriving body thicknesses of the subject as a first body thickness and a second body thickness, respectively, for each pixel for each of the two radiation images by using an attenuation coefficient according to an order in which the radiation is transmitted through the plurality of compositions, and deriving a composition ratio of the subject for each pixel of the radiation image based on the first body thickness and the second body thickness.

Supplementary Note 14

A radiation image processing program causing a computer to execute a procedure of acquiring two radiation images based on radiation that is transmitted through a subject including a plurality of compositions and has different energy distributions from each other, a procedure of deriving body thicknesses of the subject as a first body thickness and a second body thickness, respectively, for each pixel for each of the two radiation images by using an attenuation coefficient according to an order in which the radiation is transmitted through the plurality of compositions, and a procedure of deriving a composition ratio of the subject for each pixel of the radiation image based on the first body thickness and the second body thickness.

What is claimed is:

1. A radiation image processing device comprising:
at least one processor,
wherein the processor
acquires two radiation images based on radiation that is transmitted through a subject including a plurality of compositions and has different energy distributions from each other,
derives body thicknesses of the subject as a first body thickness and a second body thickness, respectively, for each pixel for each of the two radiation images by using an attenuation coefficient according to an order in which the radiation is transmitted through the plurality of compositions, and derives a composition ratio of the subject for each pixel of the radiation image based on the first body thickness and the second body thickness.

2. The radiation image processing device according to claim 1,
wherein the processor derives the composition ratio by regarding the subject as a model that is divided such that the plurality of compositions each are grouped together to have one thickness.

3. The radiation image processing device according to claim 1,
wherein the processor derives the composition ratio based on a difference between the first body thickness and the second body thickness.

4. The radiation image processing device according to claim 1,
wherein the processor changes a thickness of the composition and an attenuation coefficient for each composition to derive the first body thickness and the second body thickness by using the changed thickness of the composition and the changed attenuation coefficient for each composition, and derives the composition ratio based on the thickness of the composition in which a difference between the first body thickness and the second body thickness is equal to or less than a predetermined threshold value.

5. The radiation image processing device according to claim 1,
wherein the processor
removes scattered ray components included in the two radiation images, and
derives the composition ratio based on the two radiation images from which the scattered ray components are removed.

6. The radiation image processing device according to claim 1,
wherein the two radiation images are acquired by two radiation detectors stacked on each other by simultaneously irradiating the two radiation detectors with the radiation transmitted through the subject.

7. The radiation image processing device according to claim 1,
wherein the processor displays a distribution of the composition ratio in a superimposed manner on any one of the two radiation images on a display.

8. The radiation image processing device according to claim 1,
wherein the plurality of compositions are muscle and fat.

9. The radiation image processing device according to claim 1,
wherein the plurality of compositions are a bone part and a soft part.

10. The radiation image processing device according to claim 1,
wherein the plurality of compositions are a contrast agent injected into the subject and a tissue other than the contrast agent.

11. The radiation image processing device according to claim 1,
wherein the processor derives a composition image for at least one composition of the plurality of compositions based on the two radiation images and the composition ratio.

12. The radiation image processing device according to claim 11,
wherein the processor quantifies the composition represented by the composition image based on the composition image.

13. A radiation image processing method comprising:
acquiring two radiation images based on radiation that is transmitted through a subject including a plurality of compositions and has different energy distributions from each other;
deriving body thicknesses of the subject as a first body thickness and a second body thickness, respectively, for each pixel for each of the two radiation images by using an attenuation coefficient according to an order in which the radiation is transmitted through the plurality of compositions; and
deriving a composition ratio of the subject for each pixel of the radiation image based on the first body thickness and the second body thickness.

14. A non-transitory computer-readable storage medium that stores a radiation image processing program causing a computer to execute:
a procedure of acquiring two radiation images based on radiation that is transmitted through a subject including a plurality of compositions and has different energy distributions from each other;
a procedure of deriving body thicknesses of the subject as a first body thickness and a second body thickness, respectively, for each pixel for each of the two radiation images by using an attenuation coefficient according to an order in which the radiation is transmitted through the plurality of compositions; and
a procedure of deriving a composition ratio of the subject for each pixel of the radiation image based on the first body thickness and the second body thickness.

* * * * *